April 16, 1935.  C. E. MELKER  1,997,884
PISTON ROD CONNECTION
Filed May 16, 1934
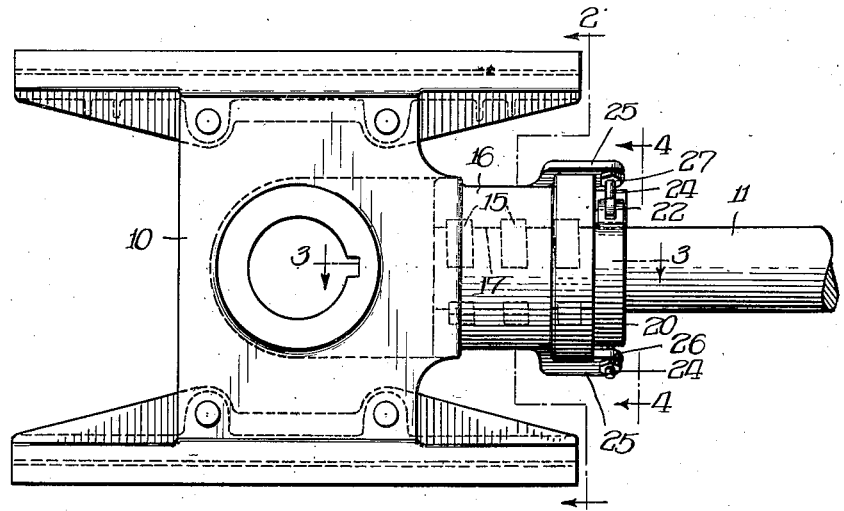
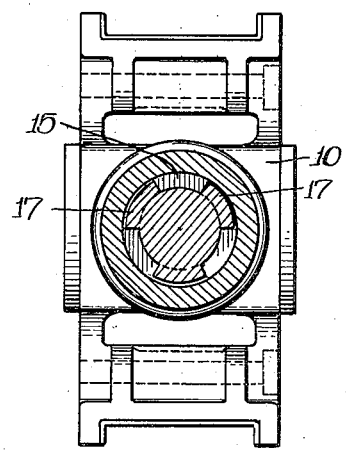
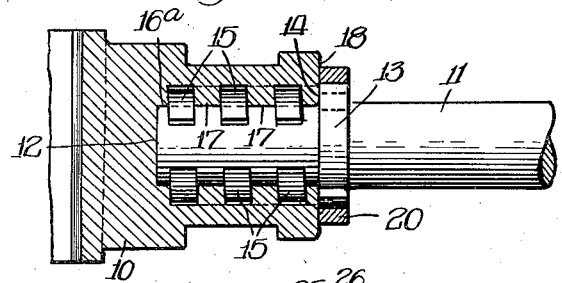
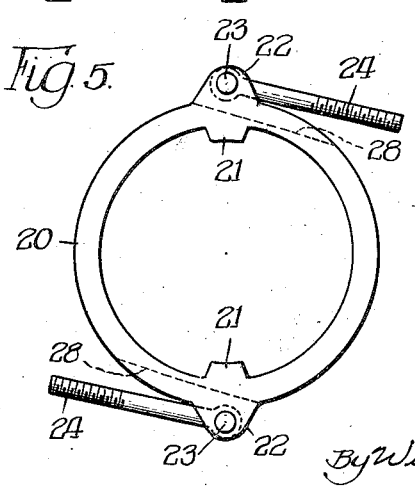
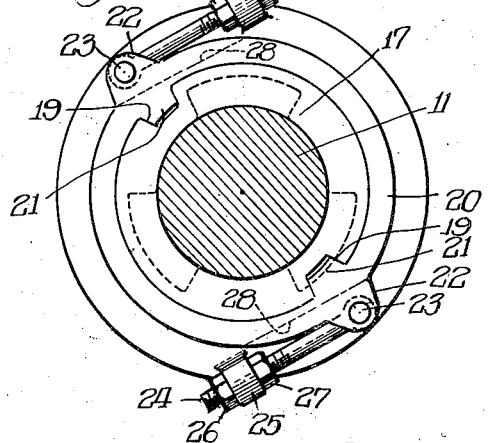
Inventor:
Charles E. Melker, Patented Apr. 16, 1935

1,997,884

UNITED STATES PATENT OFFICE 1,997,884

PISTON ROD CONNECTION

Charles E. Melker, Hannibal, Mo.

Application May 16, 1934, Serial No. 725,871

7 Claims. (Cl. 287—119)

The present invention relates to piston rod connections.

In connecting piston rods to crossheads, particularly in locomotive work, it has been common practice to provide driving tapered fits between the parts, crosshead keys being used to hold the parts in rigid relationship with one another. The provision of the keyway for the crosshead key has weakened the construction. Piston rods or crossheads have been damaged due to the excessive force which has been exerted in driving the keys home. Moreover, according to the prior practice referred to, it has been a difficult and unsatisfactory operation to remove the piston rod from the crosshead.

An object of the present invention is to provide a construction of piston rod and crosshead which will have the advantages of strong construction combined with light weight.

A further object is to provide a piston rod connection which will eliminate the use of crosshead keys, with the attendant advantage that keyways will be unnecessary.

A further object is to provide a piston rod connection in which firm longitudinal bearings may be had at at least two points along the piston rod, resulting in improved rigidity.

A further object is to provide a piston rod connection which avoids driving tapered fits and the use of crosshead keys.

A further object is to provide a construction of crosshead and piston rod by means of which said instrumentalities may be connected together with a maximum of rigidity and a maximum of ease and may be readily disassembled when desired.

A further object is to provide an improved construction connecting a piston rod or other elongated member to a crosshead or the like in which the members have broad bearing cooperating surfaces at at least two points disposed longitudinally of the piston rod or the like, together with readily operable means for securing said members in fixed relationship with each other or in disassembling said members.

Further objects will appear as the description proceeds.

Referring to the drawing—

Figure 1 is a view in elevation of a crosshead and piston rod embodying the principles of the present invention;

Figure 2 is a view, partly in section, taken along the planes indicated by the arrows 2—2 of Figure 1;

Figure 3 is a longitudinal sectional view taken along the plane indicated by the arrows 3—3 of Figure 1;

Figure 4 is a view on an enlarged scale showing a detail of construction; and

Figure 5 is an end view of a collar wrench forming a detail of the structure shown in Figure 4.

The numeral 10 indicates a crosshead and the numeral 11 indicates a piston rod. Said piston rod 11 has its end surface 12 normal to the longitudinal axis of said rod and is provided adjacent to but spaced from the end 12 with the annular shoulder 13, which shoulder has the surface 14 parallel with the end surface 12 of the piston rod. Spaced between the shoulder 13 and the end surface 12 is a series of interrupted threads 15. Expressed in other language, said members 15—15 are spirally disposed splines, three of said splines being disposed within a range of 360 degrees. Said splines 15—15 register with each other longitudinally of the piston rod 11.

The crosshead 10 is provided with the portion 16 apertured, as indicated by the numeral 16a, to receive the splined portion of the connecting rod 11. To this end the portion 16 of the crosshead 10 is provided with the splines 17—17, which are spirally disposed with respect to one another and spaced apart spirally a sufficient distance to receive the spirally disposed splines 15—15 of the crosshead 11. The portion 16 of the crosshead 10 is provided with the plane surface 18 adapted to provide a bearing surface for the cooperating face 14 of the shoulder 13 of the piston rod 11. The end surface 12 of the piston rod 11 engages flatwise with the bottom of the cooperating aperture 16a in the crosshead 10.

The shoulder 13 of the piston rod 11 is provided with a pair of diametrically opposed notches 19—19. Disposed upon said shoulder is a collar 20 having a pair of diametrically opposed teeth 21—21 fitting into the notches 19—19 in the shoulder 13. The collar 20 is provided at diametrically opposed regions adjacent to the teeth 21—21 with a pair of bifurcated lugs 22—22, which bifurcated lugs carry pins 23—23. Each of said pins 23 swingingly supports an eye-bolt 24. Disposed upon the portion 16 of the crosshead 10 are a pair of diametrically opposed shoulders 25—25 having apertures for receiving the swinging extremities of the eye-bolts 24—24. A nut 26 is disposed upon each eye-bolt 24 near the extremity thereof, which nut is adapted to engage its corresponding shoulder 25 to exert a pulling force upon the eye-bolt 24 to urge the collar 20 in a clockwise direction as the parts are viewed in Figure 4. Each of said eye-bolts is provided with another nut 27 disposed between the corresponding lug 22 and the corresponding shoulder 25. Each of said nuts 27 is adapted to be turned up into engagement with its corresponding shoulder 25. The collar 20 may be recessed as indicated by the numerals 28—28 to permit the bolts 24—24 to enter the apertures in the lugs 25—25 as said collar 20 is turned in a clockwise direction as the parts are viewed in Figure 4.

The mode of operation of the above described embodiment of the present invention is substantially as follows: The piston rod 11 will be assembled to the crosshead 10 by inserting said piston rod with the splines 15—15 thereof disposed in alignment with the spaces between the splines 17—17 of the portion 16 of the crosshead 10. When said piston rod 11 has been inserted longitudinally into said portion 16 a predetermined distance, said piston rod will be turned. As the parts are illustrated, a clockwise direction of rotation of the piston rod 11 (as the parts are viewed in Figures 2 and 4) will result in the screwing home of said piston rod 11. The shoulder 13 and the end face 12 of the piston rod 11 should be so positioned relative to the splines 15—15 thereof and with respect to the face 18 and the bottom of the aperture in the portion 16, as well as the splines 17—17, that said piston rod 11 should bottom itself at substantially the same instant that the face 14 of the shoulder 13 engages the face 18. At this instant the splines 15—15 should preferably be in aligned position with relation to the splines 17—17, or should be approaching such aligned position. In other words, when the connecting rod 11 has been inserted into the portion 16 of the crosshead and has been given substantially one-sixth of a turn, said connecting rod 11 should be securely bottomed in the crosshead, the shoulder 13 should be in intimate engagement with the face 18 of the crosshead, and the splines 15—15 on the piston rod 11 should be completely or almost completely enmeshed with the splines 17—17.

While the piston rod 11 is being turned into home position, as above described, the collar wrench 20 will be disposed upon the shoulder 13 with the teeth 21—21 of said collar wrench located within the notches 19—19 of the shoulder 13. At this time the nuts 26—26 will be removed from the eye-bolts 24—24 and the swinging extremities of said eye-bolts 24—24 will be inserted through the apertures in the lugs 25—25. As the piston rod 11 is turned home, said eye-bolts 24—24 will be thrust through said lugs 25—25. The apertures in said lugs 25—25 will, of course, be sufficiently large to permit a slight angular movement in each eye-bolt as the piston rod moves longitudinally while it is being screwed home and to permit a slight swinging movement of the eye-bolts 24—24 as the lugs 22—22 are moved circumferentially. The nuts 26—26 will then be threaded upon the eye-bolts 24—24 and the piston rod will be held securely against counterclockwise movement as the parts are viewed in Figure 4 by reason of the engagement of the nuts 26—26 with the lugs 25—25. The nuts 27—27 will be turned up to engage the other sides of the lugs 25—25 whereby the parts will be held in rigid relationship.

When it is desired to disassemble the piston rod 11 from the crosshead 10, the nuts 26—26 will be backed off and the nuts 27—27 will be turned to exert a strong thrust against the lugs 25—25 to loosen the piston rod 11 from the crosshead 10, whereby said piston rod 11 may be turned to a position in which the splines 15—15 thereof are out of registry with the splines 17—17, after which the piston rod 11 may be moved out longitudinally to a position free of said crosshead 10.

By reason of the present invention a construction is provided in which longitudinal end thrust of the piston rod is taken by two bearing surfaces embodied in the end face 12 of the piston rod and the face 14 of the shoulder 13 of said piston rod. The home position of the piston rod is maintained by reason of the engagement of the nuts 26—26 with their corresponding lugs 25—25, whereby an absolutely rigid construction is had without the use of crosshead keys and their corresponding keyways. Disassembling of the piston rod 11 from the crosshead 10 may be accomplished without the use of blows, which are so frequently destructive in other constructions, which blows are necessary in removing the crosshead keys and in loosening the piston rod from the crosshead.

Though a preferred embodiment of the present invention has been described in detail, many modifications will occur to those skilled in the art. It is intended to cover all such modifications that fall within the scope of the appended claims.

What is claimed is—

1. In combination, a piston rod member, a crosshead member, said piston rod member having a plurality of spirally disposed splines thereon, said crosshead member having an aperture with spirally disposed splines therein, the splines of said piston rod member being spaced apart spirally, the splines of said crosshead member being spaced apart spirally a distance sufficient to receive the splines of said first member, said members having cooperating bearing surfaces for taking up end thrust, and threaded means for setting up a thrust tangentially between said members selectably in either of two directions.

2. In combination, a piston rod member having a series of spirally disposed splines thereon, said splines being spaced apart and in registry with one another longitudinally of the axis of said spirally disposed splines, a crosshead member having an aperture for receiving the splined portion of said piston rod member, said crosshead member having inwardly projecting spirally disposed splines, which splines are spaced apart a sufficient distance to receive the splines of said piston rod member, said members having bearing surfaces for taking up end thrust between said members, one of said members having holding means provided with a swinging bolt, the other of said members being provided with an apertured portion for receiving said bolt, and nuts on said bolt disposed on opposite sides of said apertured portion for controlling rotary movement of said members relative to one another.

3. In combination, a first member having a series of spirally disposed splines thereon, said splines being spaced apart and in registry with one another longitudinally of the axis of said spirally disposed splines, said second member having an aperture for receiving the splined portion of said first member, said second member having inwardly projecting spirally disposed splines, which splines are spaced apart a sufficient distance to receive the splines of said first member, said members having bearing surfaces for taking up end thrust between said members, one of said members having holding means provided with a plurality of swinging bolts, the other of said members being provided with a plurality of apertured portions for receiving said bolts, and nuts on each of said bolts disposed on opposite sides of their corresponding apertured portions for controlling rotary movement of said members relative to one another.

4. In combination, a crosshead member having an apertured portion, a piston rod member, said piston rod member having near one of its ends a series of spirally disposed splines, said splines being spaced circumferentially and being in registry longitudinally of said piston rod member, said crosshead member in said apertured portion having a series of cooperating splines, said crosshead member having a shoulder and a flat end face adapted to bear against corresponding surfaces of said crosshead member, one of said members having holding means provided with a swinging bolt, the other of said members being provided with an apertured portion for receiving said bolt, and nuts on said bolt disposed on opposite sides of said apertured portions for controlling rotary movement of said members relative to one another.

5. In combination, a crosshead member having an apertured portion, a piston rod member, said piston rod member having near one of its ends a series of spirally disposed splines, said splines being spaced circumferentially and being in registry longitudinally of said piston rod member, said crosshead member in said apertured portion having a series of cooperating splines, said crosshead member having a shoulder and a flat end face adapted to bear against corresponding surfaces of said crosshead member, and threaded means for preventing relative rotative movement between said piston rod member and said crosshead member, said threaded means including a pair of swingable bolts carried by one of said members and nuts thereon cooperating with abutments fixed to the other of said members.

6. In combination, a crosshead member, a piston rod member, said members having cooperating interrupted splines for holding said members against displacement longitudinally, said members having a pair of spaced apart cooperating bearing surfaces for taking up end thrust between said members, a collar upon one of said members having toothed engagement with said one member, a pair of swingable bolts carried by said collar, abutments on the other of said members for receiving said bolts, and nuts upon said bolts cooperating with said abutments for controlling relative rotative movement between said members.

7. In combination, a crosshead, a piston rod adapted to be inserted into said crosshead, said piston rod and said crosshead having cooperating interrupted spirally disposed splines, a shoulder on said piston rod, a collar wrench upon said shoulder, said collar wrench having toothed engagement with said shoulder, a pair of swinging bolts carried by said collar, a pair of abutments rigid with said crosshead, and nuts upon said bolts cooperating with said abutments to control relative rotative movement between said crosshead and said piston rod.

CHARLES E. MELKER.